US012329706B2

(12) United States Patent
Bensoussan

(10) Patent No.: US 12,329,706 B2
(45) Date of Patent: Jun. 17, 2025

(54) PENDULAR JOINT DECOMPRESSION DEVICE

(71) Applicant: SATISFORM, Saint-Saturnin (FR)

(72) Inventor: Christophe Bensoussan, Saint-Saturnin (FR)

(73) Assignee: SATISFORM, Saint-Saturnin (FR)

( * ) Notice: Subject to any disclaimer, the term of this patent is extended or adjusted under 35 U.S.C. 154(b) by 837 days.

(21) Appl. No.: 17/293,854

(22) PCT Filed: Nov. 12, 2019

(86) PCT No.: PCT/IB2019/059693
§ 371 (c)(1),
(2) Date: May 13, 2021

(87) PCT Pub. No.: WO2020/100020
PCT Pub. Date: May 22, 2020

(65) Prior Publication Data
US 2021/0267832 A1 Sep. 2, 2021

(30) Foreign Application Priority Data
Nov. 14, 2018 (FR) ...................................... 1871526

(51) Int. Cl.
*A61H 1/02* (2006.01)

(52) U.S. Cl.
CPC ......... *A61H 1/0222* (2013.01); *A61H 1/0237* (2013.01); *A61H 2201/1215* (2013.01);
(Continued)

(58) Field of Classification Search
CPC .......... A61H 1/0222; A61H 2201/1215; A61H 2201/1418; A61H 2201/149;
(Continued)

(56) References Cited

U.S. PATENT DOCUMENTS 2,274,574 A * 2/1942 Zerne .................. A63B 21/151 482/129
2,865,367 A * 12/1958 Sorenson ............ A61H 1/0222 606/243
(Continued)

FOREIGN PATENT DOCUMENTS

WO 2008/009793 1/2008

OTHER PUBLICATIONS

International Search Report for PCT/IB2019/059693 dated Feb. 7, 2020, 5 pages.
Written Opinion of the ISA for PCT/IB2019/059693 dated Feb. 7, 2020, 5 pages.

*Primary Examiner* — Keri J Nelson
*Assistant Examiner* — Seth R. Brown
(74) *Attorney, Agent, or Firm* — NIXON & VANDERHYE

(57) ABSTRACT

A pendular joint decompression device including a table configured to support a person lying on his or her back, and a traction system including cabling, a leg-receiving unit secured to the cabling and configured to link this cabling to the person's legs, a traction unit configured to act on the cabling, an oscillator configured to act on the cabling, and a control unit capable of controlling the traction unit and the oscillator in order to combine lateral oscillation movements and traction movements on the person's raised legs, characterized by the fact that the leg-receiving unit is configured to apply, for each of the person's legs, a force on the rear of the calf and a force on the front of the ankle, simultaneously, when the traction unit acts on the cabling.

20 Claims, 6 Drawing Sheets

(52) U.S. Cl.
CPC ................ *A61H 2201/1418* (2013.01); *A61H 2201/149* (2013.01); *A61H 2201/1621* (2013.01); *A61H 2201/1642* (2013.01)

(58) Field of Classification Search
CPC .... A61H 2201/1621; A61H 2201/1642; A61H 1/0218; A61H 1/0292; A61H 2201/1616; A61H 2201/5002; A61H 2203/0456; A61H 2205/08; A61H 2205/10; A61H 1/02; A61H 1/0229; A61H 1/0266; A61H 2001/0233; A61H 1/0237–024; A61H 2001/0248–0251; A61H 1/0262
USPC ................... 601/45, 51, 53, 84, 97, 98, 101; 602/32–36, 38, 40; 482/92, 93, 101, 102, 482/907
See application file for complete search history.

(56) References Cited

U.S. PATENT DOCUMENTS

| | | | | | |
|---|---|---|---|---|---|
| 4,360,009 | A | | 11/1982 | Weisman | |
| 5,478,307 | A | * | 12/1995 | Wang | A61H 1/0222 606/245 |
| 5,480,375 | A | * | 1/1996 | La Fosse | A61H 1/0229 482/907 |
| 2005/0060912 | A1 | * | 3/2005 | Holzer | A43C 3/00 36/50.1 |
| 2009/0259253 | A1 | * | 10/2009 | Bensoussan | A61H 1/0292 606/242 |
| 2010/0113232 | A1 | * | 5/2010 | Chen | A61H 1/0229 482/133 |
| 2011/0230808 | A1 | * | 9/2011 | Lisowski | A61H 1/0229 482/131 |
| 2016/0255902 | A1 | * | 9/2016 | Legg | A43B 3/0094 |

* cited by examiner

Fig.11
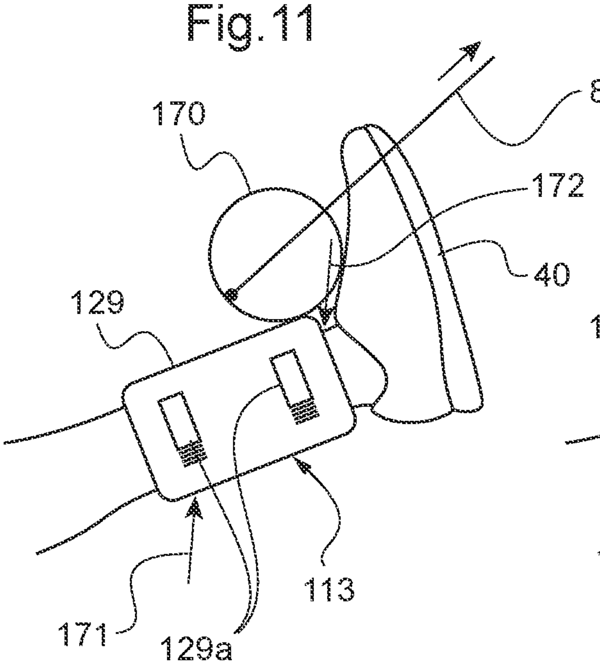
Fig.12
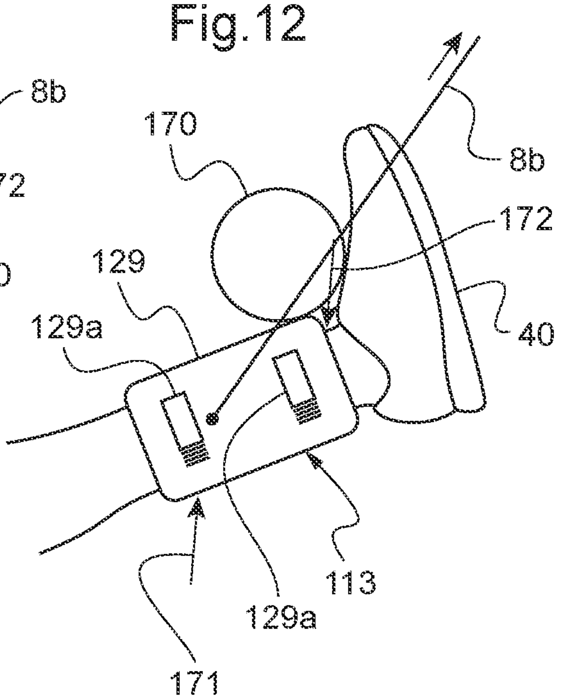
Fig.13
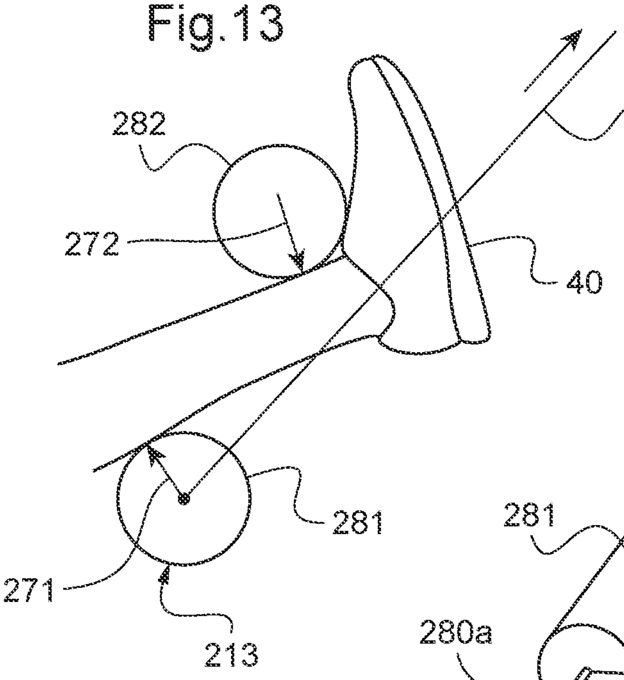
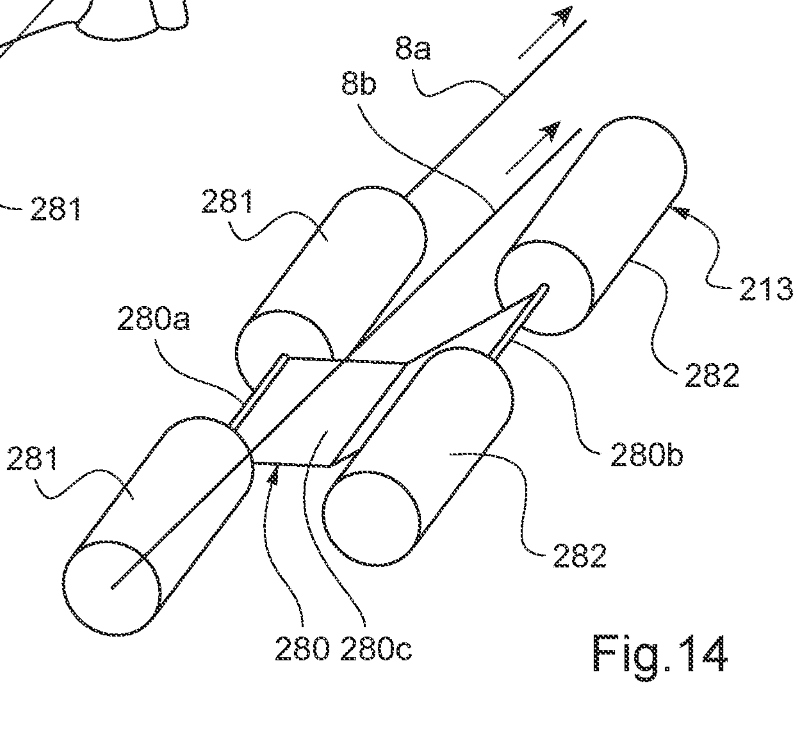
Fig.14

PENDULAR JOINT DECOMPRESSION DEVICE

CROSS-REFERENCE TO RELATED APPLICATIONS

This application is the U.S. national phase of International Application No. PCT/IB2019/059693 filed Nov. 12, 2019 which designated the U.S. and claims priority to FR 1871526 filed Nov. 14, 2018, the entire contents of each of which are hereby incorporated by reference.

BACKGROUND OF THE INVENTION

Field of the Invention

The present invention relates to the field of joint decompression, and, in particular, to a pendular joint decompression device.

Pendular joint decompression consists of decompression by neuromuscular relaxation generated by pendular movement, particularly for the ankles, knees, hips, pelvis and spine, by traction and oscillation of the legs of a person. In addition to joint decompression of the spine, pelvis, hips, knees and ankles, pendular joint decompression strengthens the deep muscles for a lasting effect. Pendular joint decompression is used in particular in the therapeutic and preventive fields and to improve physical performance.

Description of the Related Art

It is known, in particular from international application WO2008/009793A1, of a device for performing a stretching of the spine of a person, comprising a table equipped with a traction system comprising fastening means for connecting at least one cable to the feet of the person and traction means acting on at least one cable for making a traction on the legs in order to stretch the legs and the spine, and oscillation means acting on at least one cable to obtain lateral oscillation movements of both legs, the traction means and the oscillation means being controllable by a control unit in order to combine lateral oscillation movements and traction movements. When the at least one cable is constituted by a single cable, the fastening means are constituted by two leg-receiving chutes connected in parallel to each other by a central support to which the cable is directly attached. When the at least one cable is constituted by two cables, the fixing means comprise a bar to which the two cables are connected, the person's legs being directly attached to the bar between the fixing points of the two cables on the bar. However, this existing device does not allow for reproducing movement close to walking on the person's legs. Indeed, it does not allow for the person's legs to flex to generate a movement close to walking.

SUMMARY OF THE INVENTION

The present invention aims at solving the drawbacks of the prior art, by providing a pendular joint decompression device allowing for the person's legs to flex so as to generate a body movement close to walking.

The present invention therefore relates to a pendular joint decompression device comprising a table configured to support a person lying on his or her back, the table having a head end and a leg end, and a traction system positioned at the leg end of the table, elevated from the plane of the table, this traction system including cabling, leg-receiving means secured to the cabling and configured to link this cabling to the person's legs, traction means configured to act on the cabling to make traction on the legs, oscillation means configured to act on the cabling to obtain lateral oscillation movements of the legs on either side of the axis of the person's spinal column, and a control unit adapted to control the traction means and the oscillation means to combine lateral oscillation movements and traction movements on the person's raised legs, characterized by the fact that the leg-receiving means are configured to apply, for each of the person's legs, a force on the back of the calf and a force on the front of the ankle simultaneously when the traction means act on the cabling.

Thus, the leg-receiving means, designed to receive the person's legs lying on the table, allow a force to be applied on the legs at the calves as well as a force to be applied on the legs at the ankles when the cabling is tensioned, such that the leg-receiving means allow for a bearing/counter-bearing on the person's legs, allowing the pendular decompression device according to the present invention to make a leg flexing movement, in addition to the traction and oscillation movements, to reproduce a movement close to walking. The traction system acting on the cabling causes the person's legs to perform a lemniscate (a horizontal figure eight shape) in a vertical plane substantially orthogonal to the longitudinal direction of the table. This lemniscate movement causes stronger traction on the leg that runs through one of the lemniscate lobes, and less strong traction on the other leg. This stronger traction on the leg will induce a greater force on this leg at the front of the ankle and the back of the calf, to cause the leg to bend relative to the thigh, with the other leg simultaneously remaining substantially straight, to mimic the natural kinematics of the legs during walking.

Thus, the bearing/counter-bearing generated by the leg-receiving means enables the legs to flex relative to each other. Each time one leg is at the end of the oscillation movement, that is, when the left leg is located at the leftmost end of the oscillation movement or when the right leg is located at the rightmost end of the oscillation movement, the associated leg is at a higher decompression level and undergoes a higher bearing/counter-bearing intensity, which generates a knee elevation of the associated leg and less flex on the other leg.

The device according to the invention makes it possible to carry out a pendular joint decompression, a rhythmic and mechanical function, on the body of the person using it, which makes it possible to respond to new problems, such as premature aging, chronic degenerative diseases, neurological diseases, traumatic accidents and chronic pain, leading to losses of mobility and autonomy, and such as a loss of physical performance of the high-level or amateur athlete.

The device according to the invention improves physiological performance, for example by improving posture and functional dynamic functions.

The operating principle of the device according to the invention is to generate oscillations and decompressions in order to develop walking or running frequencies at the level of the legs, pelvis and spine with self-adaptation of the amplitudes according to the functional capacities (movement of the legs, pelvis and spine), which makes it possible to obtain a neuromuscular stimulation (contracting/relaxing), a gain in trophicity, and joint liberation for a gain in mobility, posture, performance, and functional independence.

The traction means and the oscillation means are adapted to be controlled by the control unit to simultaneously perform lateral oscillation movements of the legs and one or more traction movements to decompress the ankle, knee, hip and spine joints, preferably after performing lateral oscillation movements alone. Thus, after the leg oscillation movements to promote relaxation, decompression can be performed with or without oscillation.

The movement close to walking is preferably initiated by a specific frequency close to Hertz plus or minus 20% and lower preparatory frequencies. However, the invention is not limited in this respect.

The pendular joint decompression device may be used in a passive mode, that is, a mode in which the person does not resist the movements imposed by this device, or in a core-building mode, that is, a mode in which the person attempts to resist the movements imposed by this device so as to perform a core-building.

According to a first embodiment of the invention, the leg-receiving means comprise two chutes connected to each other, each chute being adapted to receive one of the person's legs and adapted to close, to block the person's legs, each chute being connected to the cabling at two distinct application points, spaced apart in the longitudinal direction of the chutes, such that when the cabling applies traction, a force is applied at the two corresponding separate application points on each chute, the cabling being configured to clamp the chutes around the legs, above the foot, at the ankle and calf of the person.

Thus, for each leg, the two separate application points of the cabling on the leg-receiving means allow a force to be applied on the associated leg at the calf as well as a force to be applied on the associated leg at the ankle when the cabling is tensioned, such that the leg-receiving means allow for a bearing/counter-bearing to be made on the person's legs, thereby allowing the pendular decompression device according to the present invention to perform a flexing movement of the legs, in addition to the traction and oscillation movements, to reproduce a movement close to walking.

The shape of each of the chutes is suitable for receiving a person's leg, with this chute open at the top when the cabling is not under tension.

When the cabling becomes taut during lifting, the cabling then tightens the chutes to close their upper portions, thereby clamping the person's legs in both chutes.

Preferably, the end of the cabling is attached to one of the edges of the top of the associated chute, with this cabling passing through a loop attached to the other edge of the top of the associated chute. Thus, tensioning the cabling during lifting brings the two edges of the top portion of the chute together so as to close the chute.

According to a second embodiment of the invention, the leg-receiving means comprise two chutes connected to each other, each chute being adapted to receive one of the person's legs, the leg-receiving means further comprising a counter-bearing bar positioned transversely to the chutes and attached above the chutes at their foot-side ends, the cabling being connected to either the counter-bearing bar or the chutes at their knee-side ends.

Preferably, the counter-bearing bar has a relatively large diameter, such as between 3 cm and 20 cm.

Thus, when the cabling is taut, the chutes apply a force on the back of the person's calves, and the counter-bearing bar, which pivots slightly toward the person's feet during lifting, allows a force to be applied on the person's ankles, such that the leg-receiving means allow a bearing/counter-bearing to be made on the person's legs, allowing the pendular decompression device according to the present invention to perform a flexing movement of the legs, in addition to the traction and oscillation movements, to reproduce a movement close to walking.

According to a third embodiment of the invention, the leg-receiving means comprise an H-bracket, each leg of the H-bracket having a cylinder at each end, the cross member of the H-bracket being configured to be positioned between the person's legs, one of the legs of the H-bracket being configured such that the cylinders at each end engage at the ankles, the other of the legs of the H-bracket being configured such that the cylinders at each end engage under the calves, with the cabling being connected to the ends of the leg of the H-bracket carrying the cylinders configured to be applied under the calves.

Thus, when the cabling is tightened during lifting, two of the cylinders allow a force to be applied on the back of the person's calves, and the other two cylinders allow a force to be applied on the person's ankles, such that the leg-receiving means allow for a bearing/counter-bearing to be made on the person's legs, allowing the pendular decompression device according to the present invention to perform a flexing movement of the legs, in addition to the traction and oscillation movements, to reproduce a movement close to walking.

According to a particular feature of the first embodiment of the invention, the closing of the chutes for blocking the person's legs is controlled by the cabling.

Thus, the cabling allows the leg-receiving means to be closed so as to block both person's legs in the leg-receiving means.

According to one variant of the invention, the cabling comprises two cables connected to the leg-receiving means, one of the two cables being associated with one of the person's legs and the other of the two cables being associated with the other of the person's legs.

According to another variant of the invention, the cabling comprises two cables to which is a bar connected, one of the two cables being connected at one of the ends of the bar and the other of the two cables being connected at the other of the ends of the bar, the cabling further comprising two straps or cables connected to the leg-receiving means, one of the two straps or cables being connected at one of the ends of the bar and the other of the two straps or cables being connected at the other of the ends of the bar.

Thus, the connection between the bar and the leg-receiving means consisting of the two straps or cables, through which the leg-receiving means are suspended from the bar, is non-rigid. The two cables ensure that the bar remains horizontal during its traction.

According to one variant of the invention, the traction system further comprises two pulleys mounted freely in rotation on the same slide mounted so as to slide on a crossbar that is arranged transversely to the table, with one of the two cables passing over one of the two pulleys and the other of the two cables passing over the other of the two pulleys, the spacing between the two pulleys on the slide corresponding, where required, to the spacing between the points of attachment of the two cables to the bar, the oscillation means being adapted to move this slide transversely over this crossbar in order to perform this lateral oscillation movements.

Thus, the two pulleys allow for guiding the two cables during their traction, and moving the slide on the crossbar by the oscillation means allows for generating a lateral oscillation movement on the bar from which the leg-receiving means are suspended.

According to another variant of the invention, the traction system further comprises two pulley assemblies mounted so as to rotate freely on the same slide mounted so as to slide on a crossbar which is arranged transversely to the table, one of the two cables passing over one of the two pulley assemblies and the other of the two cables passing over the other of the two pulley assemblies, the spacing between the two pulley assemblies on the slide corresponding, where required, to the spacing between the points of attachment of the two cables to the bar, each pulley assembly comprising two pulleys offset from each other in the longitudinal direction of the table and arranged on either side of the crossbar, the oscillation means being adapted to move the slide transversely on the crossbar to make this lateral oscillation movements.

Thus, the two pulley assemblies allow the two cables to be guided during their traction, and moving the slide on the crossbar by the oscillation means makes it possible to generate a lateral oscillation movement on the bar from which the leg-receiving means are suspended.

This variant of the invention has the advantage of being more compact.

According to one particular feature of the invention, the oscillation means comprise a cam system interposed between the drive shaft of a motor and the slide to transform the rotation movement of the drive shaft into a reciprocating movement of the slide on either side of the longitudinal plane of the table, this motor being controlled in rotation by the control unit.

Thus, the rotation of the motor drive shaft causes the cam system to move, which in turn causes the slide to move back and forth on the crossbar, so as to generate the oscillation movement on the person's legs.

The oscillation means may also be at least one of a cylinder or a step-by-step motor.

According to one particular feature of the invention, the traction system further comprises two uprights bearing the crossbar at the top, above the table, the traction means also serving as lifting means for lifting the person's legs at a determined angle with respect to the axis of the person's spine, during the lateral oscillation movements and the traction movements.

Thus, the traction system also allows for the lifting of the person's legs prior to performing the lateral oscillation and traction movements, the lifting being accomplished by traction of the cabling so as to raise the leg-receiving means.

Optionally, the two uprights are connected to the table.

The device may also comprise an angle sensing system for detecting the angle of the cables upstream of the pulleys, the angle detection system being connected to the control unit for controlling the traction means and the oscillating means.

According to one particular feature of the first embodiment of the invention, the cabling is configured to close the leg-receiving means automatically upon lifting the person's legs by the traction means, and is configured to open the leg-receiving means automatically upon lowering the person's legs by the traction means.

Thus, initial lifting of the person's legs by the traction system allowing to close the leg-receiving means automatically by tightening using the tensioned cabling.

According to one variant of the invention, the traction means comprise two winches, with the end not connected to the leg-receiving means of one of the two cables being connected to one of the two winches and the end not connected to the leg-receiving means of the other of the two cables being connected to the other of the two winches.

Thus, each cable is connected to a separate winch that is capable of winding/unwinding the associated cable, with the two winch operations being synchronized.

According to another variant of the invention, the traction means comprise a single winch, the ends not connected to the leg-receiving means of the two cables being connected to an additional bar, itself connected to the single winch by an additional cable.

Thus, both cables are connected to the same winch via the additional bar and the additional cable, the winch being capable of winding/unwinding the additional cable so as to move the additional bar, thereby moving both cables to raise or lower the leg-receiving means.

The traction means may also be at least one of a cylinder, a step-by-step motor, a weight, a mechanical lever.

According to one particular feature of the invention, each of the two winches or the single winch comprises a winch motor whose drive shaft carries a drum to which the associated cable is attached and wound, this winch motor being controlled by the control unit such that the winch motor is configured to drive the drum in a first direction to unwind the associated cable from the drum and in the reverse direction to wind the associated cable around the drum.

According to one particular feature of the invention, the leg-receiving means are covered with at least one of foam or gel.

Thus, the foam or gel provides comfort to the user during operation of the pendular joint decompression device.

Furthermore, the foam or gel also allows for the blocking of the person's leg when the chute is closed by the cabling.

According to one particular feature of the first embodiment of the invention, for each chute, a quick release fastener is placed on the cabling so as to allow for the opening of the chute.

Thus, the opening of the quick release fastener allows for easier placing of the person's leg into the chute.

According to a particular feature of the invention, the table further comprises at least one of an armpit blocking system, a waist blocking belt, a head blocking cushion, a cervical collar, and a transverse support cushion for the person's knees.

Thus, these different elements allow for blocking the different parts of the person's body, with the exception of the legs, during operation of the pendular joint decompression device.

Advantageously, the oscillation means are adapted to be controlled by the control unit to vary the frequency, amplitude and/or duration of the oscillation movements, in particular as a function of the person's height, weight, age and/or sex, and/or the traction means are adapted to be controlled by the control unit to vary the duration and/or traction force of each traction movement, and/or the number of successive traction movements, in particular as a function of the person's height, weight, age and/or sex.

BRIEF DESCRIPTION OF THE DRAWINGS

To better illustrate the object of the present invention, three preferred embodiments will be described below, by way of illustration and not limitation, with reference to the attached drawings.

In these drawings:

FIG. 11 is a side view of the leg-receiving means according to a first variant of a second embodiment of the invention;

FIG. 12 is a side view of the leg-receiving means according to a second variant of the second embodiment of the invention;

FIG. 13 is a side view of the leg-receiving means according to a third embodiment of the invention; and FIG. 14 is a perspective view of the leg-receiving means of FIG. 13.

DESCRIPTION OF THE PREFERRED EMBODIMENTS

Figure 1:
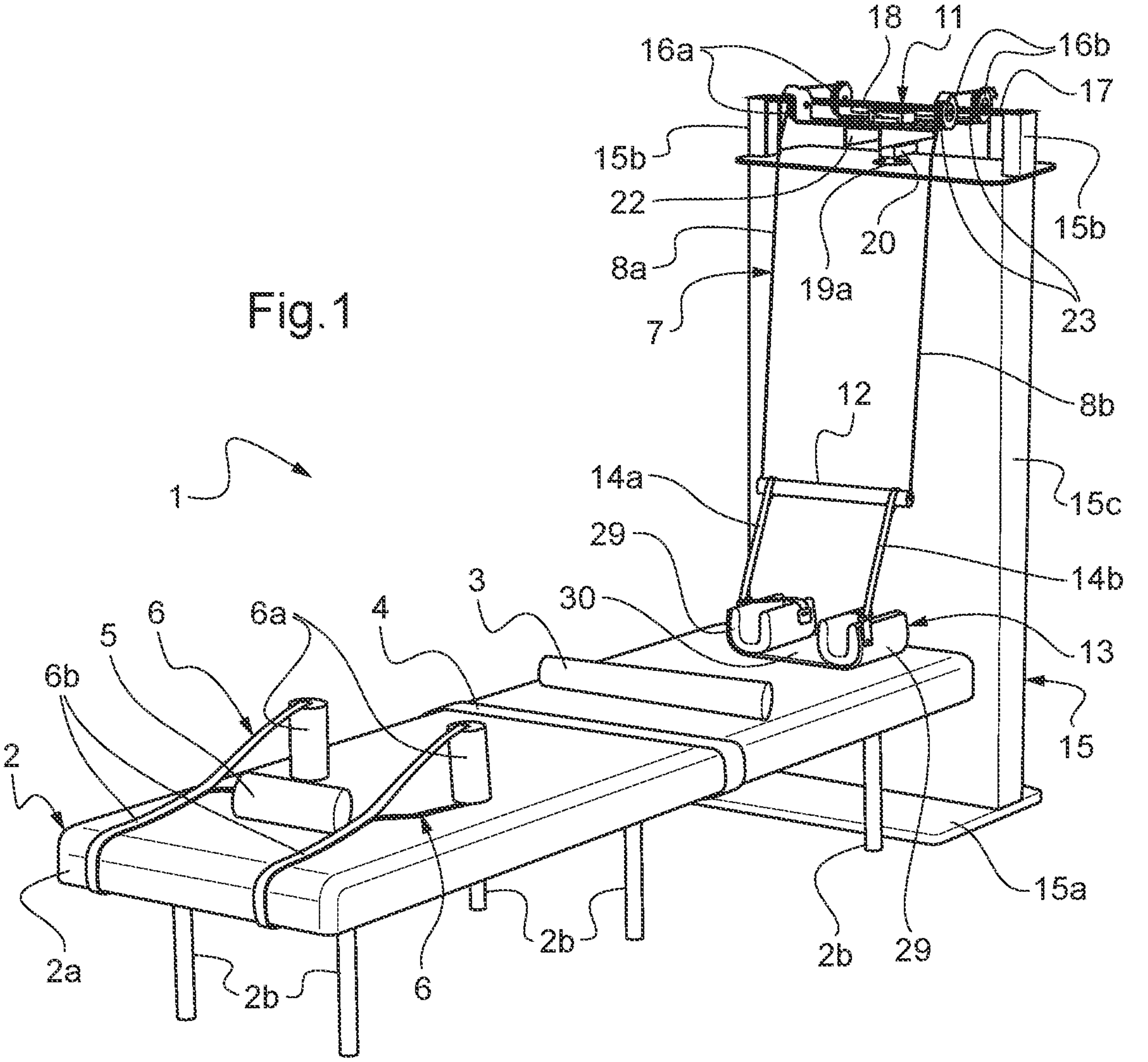
FIG. 1 is a schematic perspective view of a pendular joint decompression device according to a first embodiment of the present invention.
Figure 4:
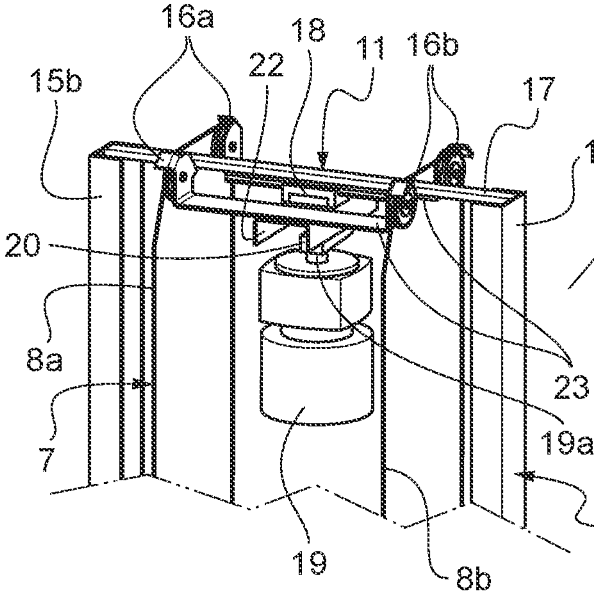
FIG. 4 is an enlarged perspective view of an upper part of the device of FIG. 1, in the absence of a cover, illustrating the oscillation means.

Referring to FIGS. 1 to 5, it can be seen that a pendular joint decompression device 1 according to a first embodiment of the present invention is shown there.

The pendular joint decompression device 1 comprises a table 2 configured to support a person lying on his or her back, the table 2 comprising a horizontal top 2*a*, equipped with a mattress, raised by vertical legs 2*b*.

The table 2 further comprises a horizontal transverse cushion 3 that defines a support surface for the person's knees, a belt 4 for blocking the person's waist, a cushion 5 that defines a support surface for the person's head, and two armpit blocking systems 6 that allow the person to be held lying by the armpits. Each armpit blocking system 6 comprises a vertical coil 6*a* intended to be placed under one of the person's armpits, the vertical coil 6*a* being connected to a strap 6*b*, whose two ends are attached under the horizontal top 2*a* of the table 2.

Thus, the various elements 3, 4, 5, 6 mentioned above allow for various parts of the person's body, except for the legs, to be blocked during operation of the pendular joint decompression device 1.

The pendular joint decompression device 1 further comprises a traction system 7 arranged at the leg end of the table 2, which is elevated with respect to the plane of the horizontal top 2*a* of the table 2.

The traction system 7 allows for traction to be applied on the person's legs to stretch the legs and back, by means of a cabling.

The traction system 7 comprises two cables 8*a* and 8*b*, leg-receiving means 13 secured to the two cables 8*a* and 8*b* and configured to connect the two cables 8*a* and 8*b* to the person's legs lying on the table 2, traction means 10 (specifically represented in FIG. 5) configured to act on the two cables 8*a* and 8*b* to make traction on the person's legs, oscillation means 11 (specifically represented in FIG. 4) configured to act on the two cables 8*a* and 8*b* to obtain lateral oscillation movements of the person's legs on either side of the axis of the spinal column of the person and a control unit (not shown in the Figures) adapted to control the traction means 10 and the oscillation means 15 to combine lateral oscillation movements and traction movements on the person's raised legs.

A bar 12 is connected to the two cables 8*a* and 8*b*, with one 8*a* of the two cables 8*a*, 8*b* being connected at one end of the bar 12 and the other 8*b* of the two cables 8*a*, 8*b* being connected at the other end of the bar 12.

The leg-receiving means 13 are adapted to receive the person's legs and adapted to close in order to block the person's legs, the leg-receiving means 13 being suspended from the bar 12 via two straps 14*a* and 14*b*, one 14*a* of the two straps 14*a*, 14*b* being connected at the end of the bar 12 connected to the cable 8*a*, and the other 14*b* of the two straps 14*a*, 14*b* being connected at the end of the bar 12 connected to the cable 8*b*.

It should be noted that the decompression device 1 may also not comprise a bar 12, with the two cables 8*a*, 8*b* being directly connected to the two straps 14*a*, 14*b*, respectively, without departing from the scope of the present invention. Furthermore, the decompression device 1 may also not comprise straps 14*a*, 14*b*, in which case the two cables 8*a*, 8*b* are directly connected to the leg-receiving means 13, without departing from the scope of the present invention. Finally, the two straps 14*a*, 14*b* may also be replaced by two other cables, without departing from the scope of the present invention.

The leg-receiving means 13 will be described in more detail in FIGS. 8 and 9.

It should be noted that the traction system 7 may also comprise a single traction cable, without departing from the scope of the present invention. However, the use of two cables 8*a* and 8*b* makes it possible to limit or avoid an oscillation phenomenon of the legs around the point of attachment of the single cable to the bar 12.

The connection between the bar 12 and the leg-receiving means 13, constituted by the two straps 14*a* and 14*b* through which the leg-receiving means 13 are suspended from the bar 12, being non-rigid, the pendular joint decompression device 1 according to the present invention allows a flexing movement of the legs, in addition to the traction and oscillation movements, to reproduce a movement close to walking.

The operating principle of the device 1 according to the invention is to generate oscillations and decompressions in order to develop walking or running frequencies at the level of the legs, pelvis and spine with self-adaptation of the amplitudes according to the functional capacities (movement of the legs, pelvis and spine), which makes it possible to obtain neuromuscular relaxation, a gain in trophicity, and joint liberation for a gain in mobility, posture, performance and functional autonomy.

The traction means 10 and the oscillation means 11 are adapted to be controlled by the control unit in order to simultaneously perform lateral oscillation movements of the legs and one or more traction movements to decompress the ankle, knee, hip and spine joints, preferably after performing lateral oscillation movements alone. Thus, after the leg oscillation movements to prepare for decompression, the decompression can be performed with or without oscillation. However, in order to reproduce a movement close to walking, simultaneous traction and oscillation movements must be performed by the device 1 on the person's legs.

The pendular joint decompression device 1 further comprises a traction system support 15 positioned at the leg end of the table 2, this support 15 being capable of holding the traction system 7, the traction means 10 being positioned at the lower part of the support 15 and the oscillation means 11 being positioned at the upper part of the support 15.

It should be noted that the traction system support 15 may also be secured to the table 2, without departing from the scope of the present invention.

The support 15 consists of a base 15*a* from which rise two uprights 15*b* rise, with a cover 15*c* being placed on the two uprights 15*b*.

The traction system 7 further comprises first 16*a* and second 16*b* pairs of freely rotatable pulleys positioned at the upper portion of the support 15, one 8*a* of the two cables 8*a*, 8*b* passing over the first pair of pulleys 16*a* and the other 8*b* of the two cables 8*a*, 8*b* passing over the second pair of pulleys 16*b*, with the spacing between the first 16*a* and second 16*b* pairs of pulleys corresponding to the spacing between the points of attachment of the two cables 8*a*, 8*b* to the bar 12.

A horizontal crossbar 17 is assembled, transversely to the table 2, between the two upper ends of the two uprights 15*b* of the support 15.

The two pulleys 16*a* of the first pair of pulleys 16*a* are offset from each other in the longitudinal direction of the table 2 and arranged on either side of the crossbar 17. Similarly, the two pulleys 16*b* of the second pair of pulleys 16*b* are offset from each other in the longitudinal direction of the table 2 and positioned on opposite sides of the crossbar 17.

A slide 18 is mounted so as to slide on the crossbar 17, the slide 18 comprising ribs that are received in longitudinal grooves formed on the crossbar 17 to ensure that it is locked in rotation.

The two pairs of pulleys 16*a*, 16*b* are connected to the slide 18, the oscillation means 11 being capable of transversely moving the slide 18 on the crossbar 17.

The two pairs of pulleys 16*a*, 16*b* thus make it possible to guide the two cables 8*a*, 8*b* during their traction, and moving the slide 18 on the crossbar 17 by the oscillation means 11 makes it possible to generate a lateral oscillation movement on the bar 12 from which the leg-receiving means 13 are suspended.

It should be noted that each pair of pulleys may also be replaced by a single pulley of larger diameter, without departing from the scope of the present invention.

Figure 6:
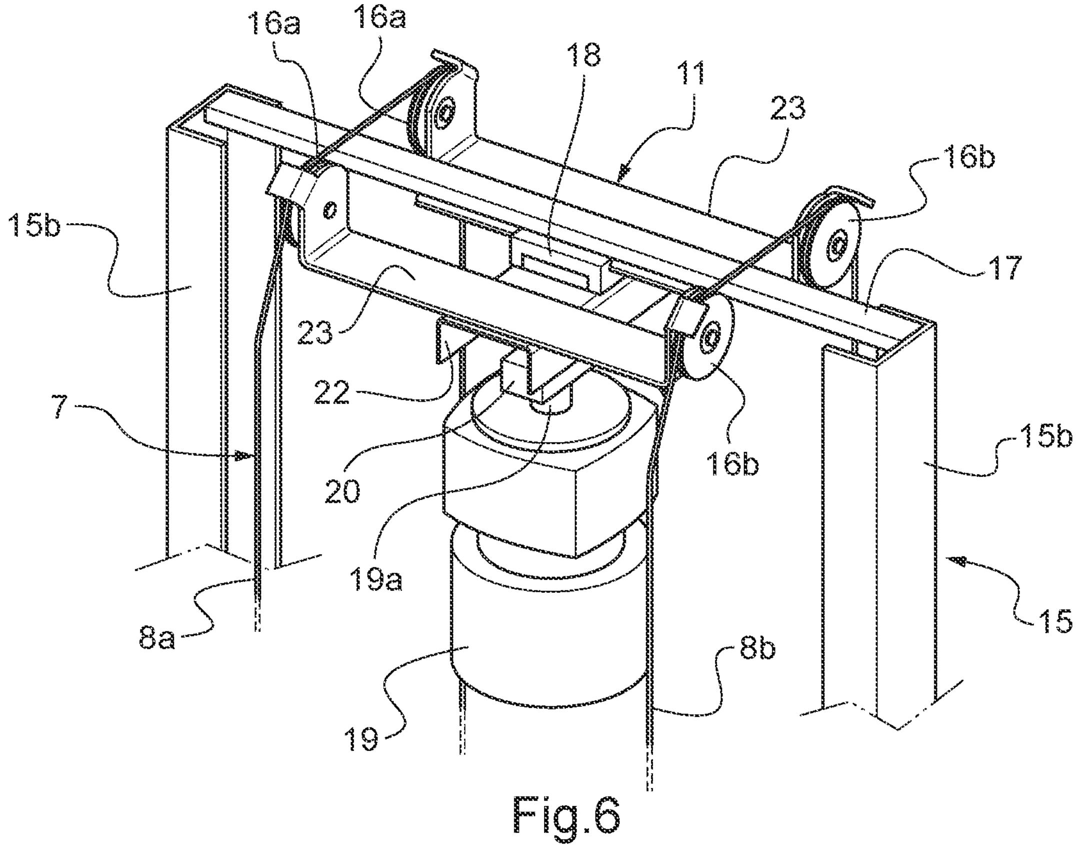
FIG. 6 is a partial enlarged perspective view of FIG. 4.
Figure 7:
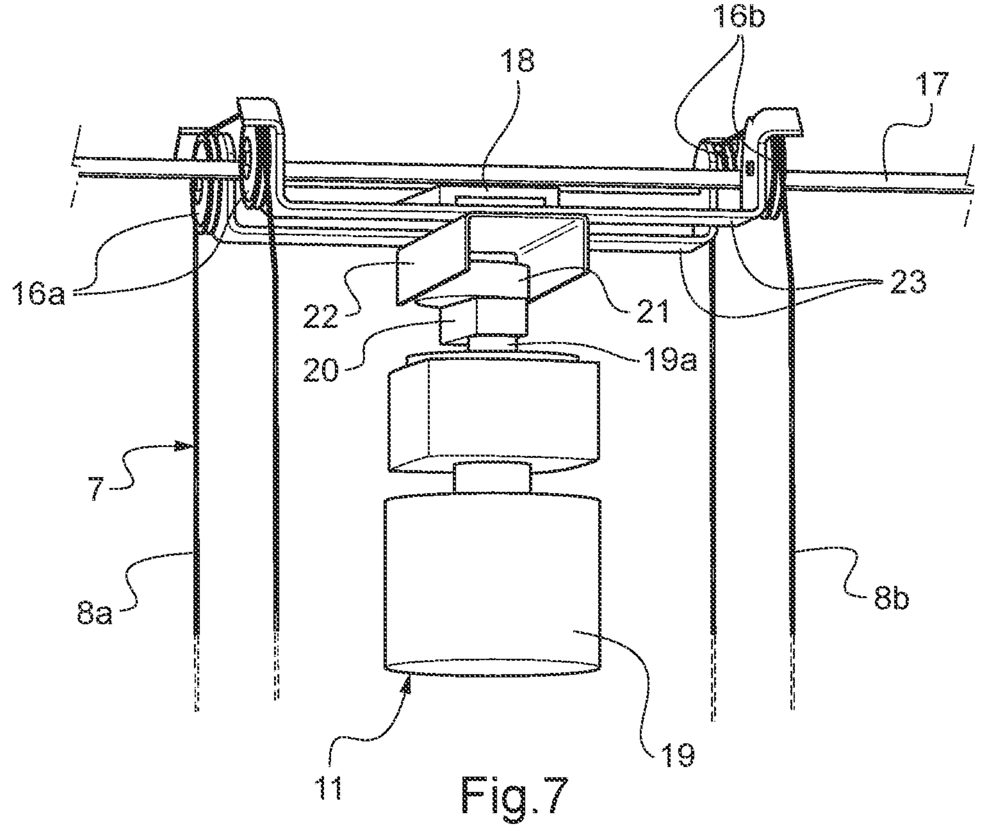
FIG. 7 is a perspective view of FIG. 6 from another angle.

Referring to FIGS. 6 and 7, the oscillation means 11 of the pendular joint decompression device 1 can be seen.

The oscillation means 11 comprises a motor 19 mounted under the two pairs of pulleys 16*a*, 16*b* and whose drive shaft 19*a* is arranged parallel to the uprights 15*b*. A cam link rod 20 is attached to the drive shaft 19*a* and carries a cam pad 21 at its free end. The cam pad 21 is pivotally mounted on this cam link rod 20, about a vertical axis, and slides in a U-shaped cross-section guide rail 22 that is secured to the slide 18 and arranged perpendicular to the crossbar 17. The rotation of the cam pad 21 by the motor 19 generates a back and forth movement of the slide 18 on either side of its central reference position. The drive shaft 19*a* of the motor 19 is offset from the longitudinal plane so that the slide 18 moves the same distance on either side of its central reference position when the cam pad 21 makes a complete turn. The rotation of the motor 19 is controlled by the control unit. Preferably, the control unit is connected to a position sensor (not shown in the Figures) to ensure that the slide 18 stops in its central reference position after an oscillation phase.

The two pairs of pulleys 16*a*, 16*b* are connected to the slide 18 by means of two bars 23 parallel to the crossbar 17 and arranged on either side of the crossbar 17, these two bars 23 being attached to the guide rail 22, itself attached to the slide 18. Thus, the back and forth movement of the slide 18 enables the translational movement of the pairs of pulleys 16*a*, 16*b* along the crossbar 17, so as to generate an oscillating movement on the person's legs.

Figure 5:
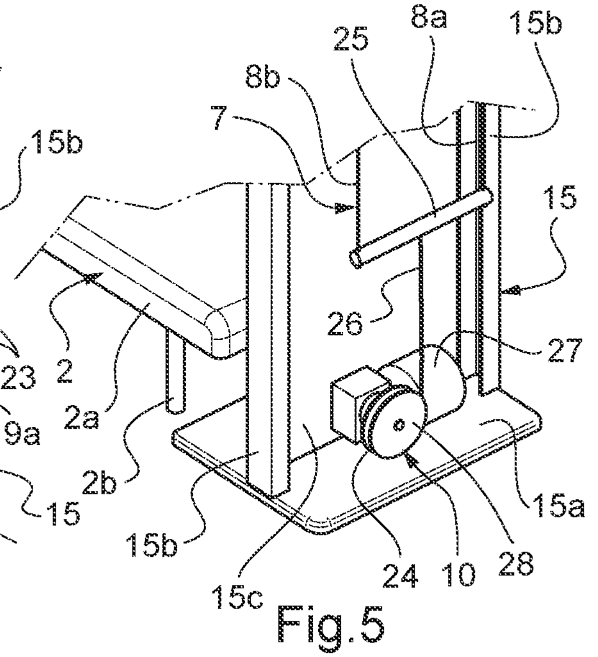
FIG. 5 is a perspective view of a lower part of the device of FIG. 1, illustrating in particular the traction means.
Figures 2, 3:
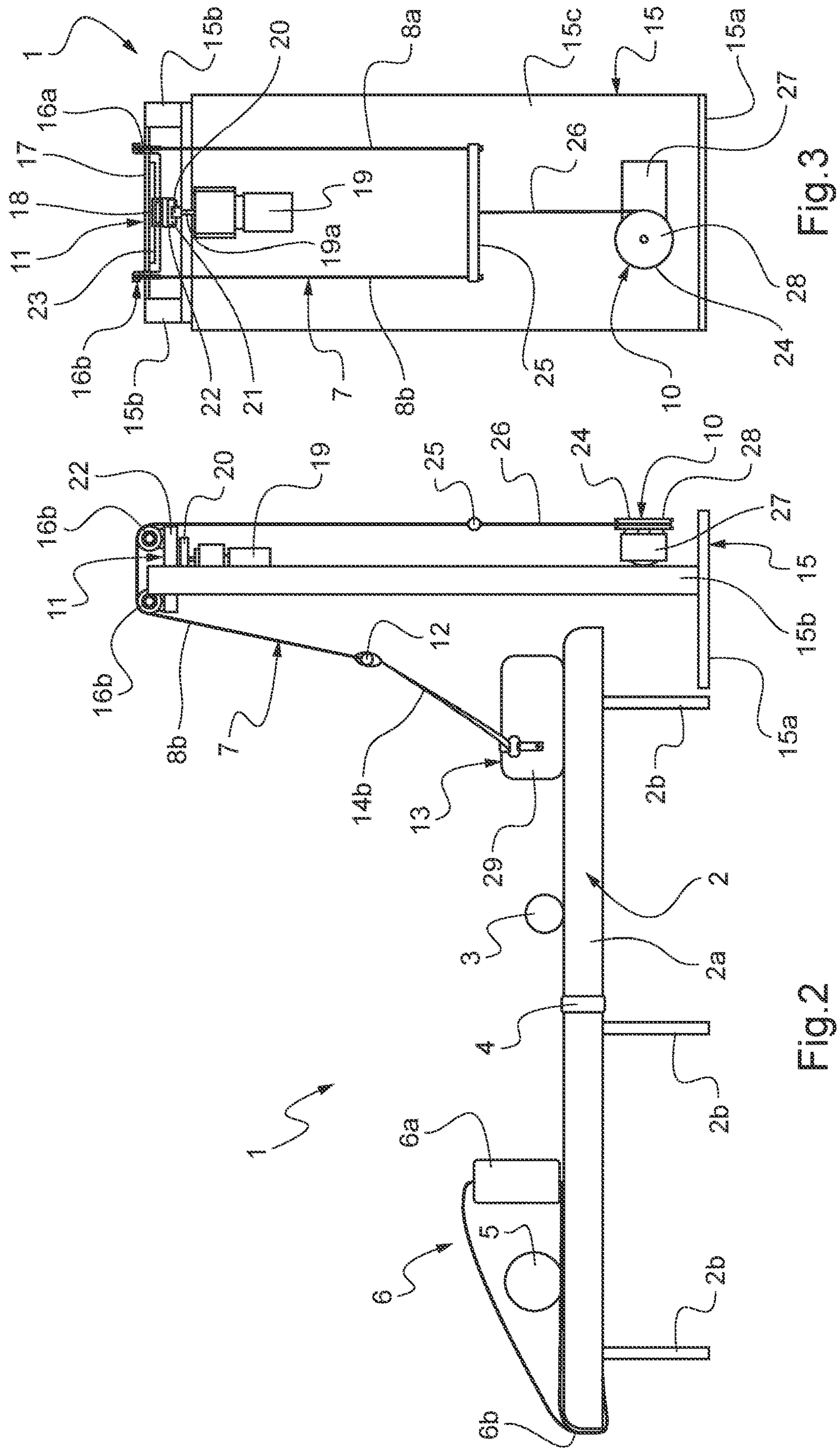
FIG. 2 is a side view of the device of FIG. 1.
FIG. 3 is a rear view of the device of FIG. 1.

The traction means 10, shown in FIGS. 2, 3 and 5, comprises a winch 24, the ends of the two cables 8*a*, 8*b* not connected to the bar 12 being respectively connected to the ends of an additional horizontal bar 25 itself connected to the winch 24 by an additional cable 26. The length of the additional bar 25 is identical to that of the bar 12, and the additional cable 26 is connected to the additional bar 25 at the center of the length of the latter.

The winch 24 comprises a winch motor 27, the drive shaft of which holds a drum 28 to which the additional cable 26 is attached and wound, this winch motor 27 being controlled by the control unit such that the winch motor 27 is configured to drive the drum 28 in a first direction to unwind the additional cable 26 from the drum 28 and in the reverse direction to wind the additional cable 26 around the drum 28.

Thus, the winch 24 is capable of winding/unwinding the additional cable 26 so as to move the additional bar 25, thereby causing the two cables 8*a*, 8*b* to move to raise or lower the bar 12 from which the leg-receiving means 13 are suspended.

It should be noted that the traction means 10 may also comprise a separate winch for each of the two cables 8*a*, 8*b*, without departing from the scope of the present invention.

The winch 24 also serves as a lifting means for lifting the person's legs at a predetermined angle relative to the axis of the person's spine during the lateral oscillation and traction movements.

The winch 24 may also comprise a safety system configured to limit the winding of the additional cable 26 in the event of a malfunction of the winch 24 or of the control unit, and thereby protect the device 1 and the person.

Figure 8:
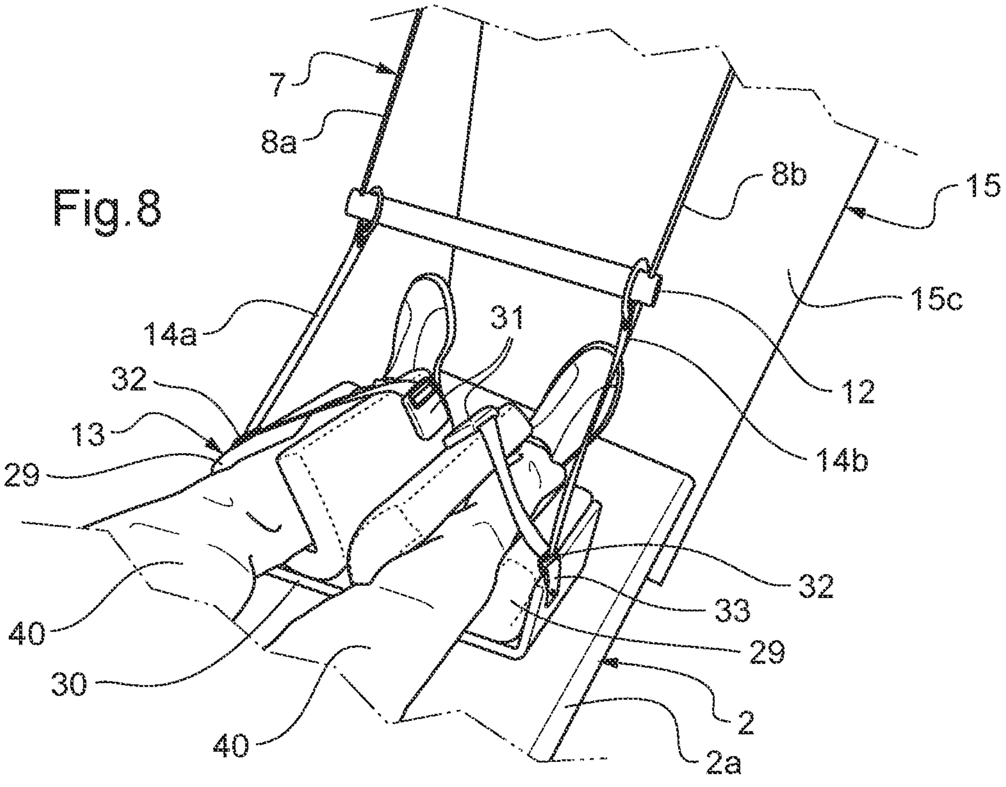
FIG. 8 is a perspective view of the leg-receiving means of FIG. 1 when lowered.
Figure 9:
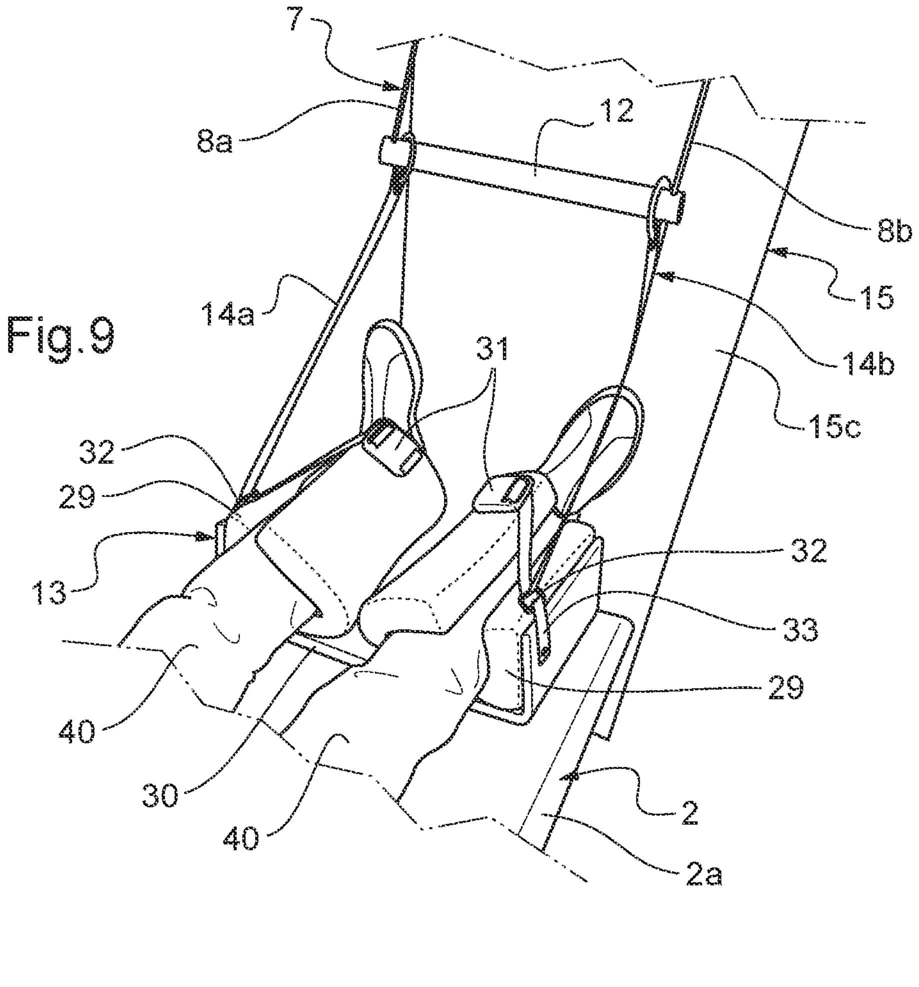
FIG. 9 is a perspective view of the leg-receiving means of FIG. 1 when raised.

Referring to FIGS. 8 and 9, the leg-receiving means 13 of the pendular joint decompression device 1 according to the first embodiment of the invention can be seen.

The leg-receiving means 13 comprises two chutes 29 connected parallel to each other by means of a rigid lower support plate 30, the two chutes 29 being arranged perpendicular to the bar 12.

The interior of each chute 29 is made of foam or gel, such that each chute 29 is flexible.

Each chute 29 is connected to one of the two straps 14*a*, 14*b*.

Each chute 29 is open at the top when the associated strap 14*a*, 14*b* is not taut, such that each chute 29 is adapted to receive one of the person's legs 40.

The end of the strap 14*a*, 14*b* not connected to the bar 12 is attached to the edge of the open top of the chute 29 closest to the other chute 29, via a quick release fastener 31, constituting a first point of application of the strap 14*a*, 14*b* to the chute 29. Thus, the opening of the quick release fastener 31 enables the opening of the chute 29 to facilitate the placing of the person's leg 40 therein.

For each chute 29, the associated strap 14*a*, 14*b* passes through a loop positioned at the edge of the open top of the chute 29 that is farthest from the other chute, providing a second point of application of the strap 14*a*, 14*b* to the chute 29, this loop 32 being connected to the support plate 30 via an additional strap 33.

The first and second application points of each strap 14*a*, 14*b* to the associated chute 29 are distinct and spaced apart in the longitudinal direction of the chute 29, with the first point of application being closer to the person's foot than to his or her knee, and the second point of application being closer to the person's knee than to his or her foot.

Thus, tensioning the straps 14*a*, 14*b* as the bar 12 is lifted by the cables 8*a*, 8*b* automatically brings the two edges of the open top of each chute 29 together so as to tighten the chutes 29 around the person's legs 40.

In FIG. 8, the bar 12 is lowered so that both straps 14*a*, 14*b* are not taut. The chutes 29 are thus open at the top to allow the person's legs 40 to be placed.

In FIG. 9, the bar 12 is raised so that the two straps 14*a*, 14*b* tighten and then raise the leg-receiving means 13. As the straps 14*a*, 14*b* tighten during the raising of the bar 12, the straps 14*a*, 14*b* then tighten the chutes 29 so as to close their upper portions, thereby blocking the person's legs 40 in the two chutes 29.

The two separate application points of each strap 14*a*, 14*b* to the chutes 29 allow for a force to be applied on the associated leg at the calf as well as a force on the associated leg at the ankle when the associated strap 14*a*, 14*b* is tensioned by the cables 8*a*, 8*b*, such that the chutes 29 allow a bearing/counter-bearing to be made on the person's legs, which enables the pendular decompression device 1 to make a flexing movement of the legs 40, in addition to the traction and oscillation movements, to reproduce a movement close to walking.

The device 1 according to the invention operates in the following manner. The person lies down on the table 2 with his pelvis placed in a reference position defined by resting the knees against the transverse cushion 3. The person then places the belt 4 around his or her waist, the cushion 5 under his or her head and the coils 6*a* under his or her armpits. The person then places his or her legs in the two chutes 29, with the bar 12 lowered enough to allow the leg-receiving means 13 to rest on the table 2.

The control unit is then activated, for example by pressing an activation button, to initiate a pre-programmed control cycle. The slide 18 is initially in its central reference position, substantially along the axis of the spine of the lying person. Initially, the control unit drives the winch motor 27 to wind up the additional cable 26 and thereby make a pull on the legs to raise them, with the straps 14*a*, 14*b* automatically tightening the chutes 29 around the person's legs. When the bar 12 reaches a desired height, the control unit stops the winch motor 27. After this leg lifting phase, the control unit initiates an oscillation phase in which it commands the motor 19 to be turned on for a set period of time to perform lateral oscillation movements of both legs to relax the pelvis and lumbar area of the person.

The control unit then initiates a traction/oscillation phase, in which the control unit drives the winch 24 for traction while keeping the motor 19 activated to maintain the lateral oscillation movements of the legs during the stretch, thereby achieving a movement close to walking due to the flexing movement of the legs allowed by the non-rigid connection between the bar 12 and the chutes 29. This traction/oscillation phase is maintained for a determined period of time and possibly repeated after a new oscillation phase. The control unit then drives the winch motor 27 to unwind the additional cable 26 to bring the leg-receiving means 13 to rest on the table 2.

It should be noted that, in another possible control cycle, the oscillation phase may be followed by a traction phase alone, without departing from the scope of the present invention.

The control unit may comprise different pre-programmed cycles, selected for example by operating control buttons. Each cycle may be parameterized to vary: the rotational speed of the winch 24; the time of actuation of the winch 24 during the traction or traction/oscillation phase, that is, the length of additional cable 26 wound up and thus the traction force; the duration of traction; the speed of the motor 19 and thus the frequency of oscillations; and/or the duration of oscillations. The cycles can be set manually via the control buttons.

Alternatively, the control cycles may be selected and/or set automatically based on data of the person inputted into the control unit, such as age, gender, height and/or weight of the person.

Figure 10:
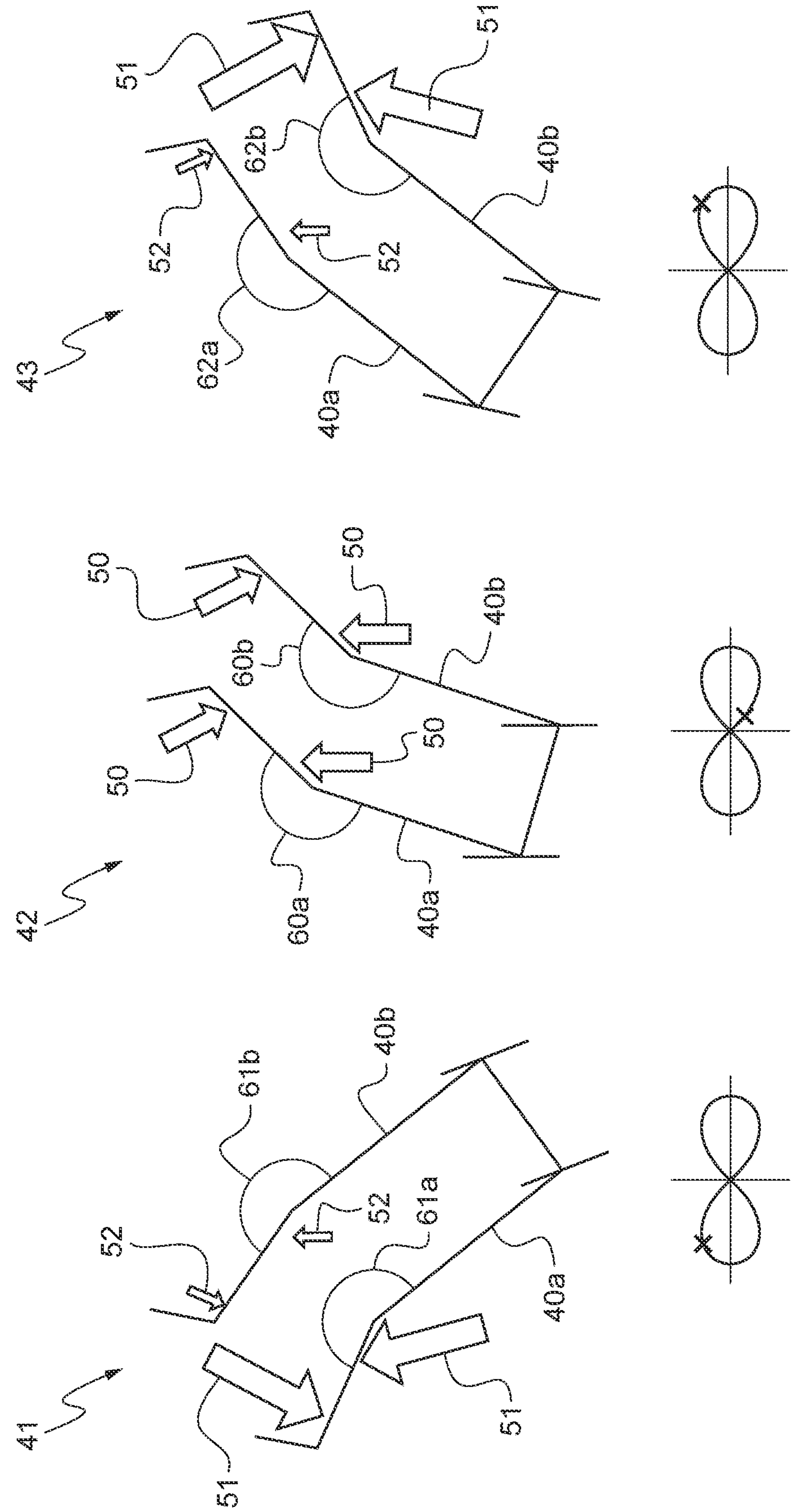
FIG. 10 is a schematic view showing different positions of the legs during the oscillation movement performed by the pendular joint decompression device.

Referring to FIG. 10, it can be seen that there are shown three schematic views 41, 42, 43 representing three different positions of the legs 40 during the oscillation movement performed by the pendular joint decompression device 1.

In each of the three schematic views 41, 42, 43, the positions of the person's left leg 40*a* and right leg 40*b* are shown according to the location on the pelvic trajectory during the oscillation movement. This trajectory of the person's pelvis during the oscillation movement is depicted under each of the three schematic views 41, 42, 43, with a cross positioned on each trajectory depiction to indicate the location on the trajectory corresponding to the schematic view 41, 42, 43 depicted above the trajectory.

The left schematic view 41 corresponds approximately to the left extremum of the pelvis trajectory, the center schematic view 42 corresponds approximately to the midpoint of oscillation of the pelvis trajectory, and the right schematic view 43 corresponding approximately to the right extremum of the pelvis trajectory.

The arrows 50, 51, 52 shown on the schematic views 41, 42, 43 represent the bearing/counter-bearing intensities at the tibia level as a function of the location on the trajectory. The larger the arrow, the greater the intensity. For each leg 40*a*, 40*b*, the lower arrow corresponds to the bearing intensity, and the upper arrow corresponds to the counter-bearing intensity, with the bearing/counter-bearing being achieved using the chutes 29 and straps 14*a*, 14*b* as explained above.

In the middle of oscillation of the trajectory (schematic view at the center 42), the bearing/counter-bearing intensities (arrows 50) applied to the two legs 40*a*, 40*b* are moderate, such that the flex angles 60*a*, 60*b* of the knees of the two legs 40*a*, 40*b* are both identical (for example, 200°).

At the left end of the trajectory (left schematic view 41), the bearing/counter-bearing intensities (arrows 51) applied to the left leg 40*a* are accentuated, while the bearing/counter-bearing intensities (arrows 52) applied to the right leg 40*b* are low, such that the knee flex angle 61*a* of the left leg 40*a* (e.g., 220°) is greater than the knee flex angle 61*b* of the right leg 40*b* (e.g., 190°).

In contrast, at the right end of the trajectory (right schematic view 43), the bearing/counter-bearing intensities (arrows 51) applied to the right leg 40*b* are accentuated, while the bearing/counter-bearing intensities (arrows 52) applied to the left leg 40*a* are low, such that the knee flex angle 62*b* of the right leg 40*b* (e.g., 220°) is greater than the knee flex angle 62*a* of the left leg 40*a* (e.g., 190°).

It should be noted that the indicated values of the knee flex angle are for illustrative purposes only.

The bearing/counter-bearing generated by the leg-receiving means 13 thus allows for the legs 40*a*, 40*b* to flex relative to each other. Whenever a leg 40*a*, 40*b* is at the end of the oscillation movement, that is, when the left leg 40*a* is located at the leftmost end of the oscillation movement or when the right leg 40*b* is located at the rightmost end of the oscillation movement, the associated leg 40*a*, 40*b* is at a higher level of decompression and undergoes a higher intensity of bearing/counter-bearing, which generates knee elevation in the associated leg 40*a*, 40*b* and less flexing on the other leg, thereby allowing a movement close to walking to be reproduced.

Referring to FIG. 11, a leg-receiving means 113 according to a first variant of a second embodiment of the present invention can be seen.

The leg-receiving means 113 according to the first variant of the second embodiment comprises two chutes 129 connected in parallel to each other, each chute 129 being adapted to receive one of the legs 40 of the person.

Each chute 129 comprises fastening means 129*a* (e.g., of the ski boot fastening or hook and loop type or such like) for closing the chute 129 after the leg is placed therein.

The leg-receiving means 113 further comprises a counter bearing bar 170 positioned perpendicular to the chutes 129 and attached above the chutes 129 at the foot-side ends thereof. The counter bearing bar 170 has a relatively large diameter, preferably between 3 centimeters and 20 centimeters.

The two cables 8*a* and 8*b* are directly connected to the counter-bearing bar 170.

The application points of the two cables 8*a* and 8*b* to the counter-bearing bar 170 are located to the rear of both ends of the counter-bearing bar 170 relative to the person's feet. However, these application points may also be located at other locations on the counter-support bar 170 (e.g., in the center of both ends of the counter-bearing bar 170), without departing from the scope of the present invention.

Thus, when the cables 8*a* and 8*b* are taut, the chutes 129 apply a force (represented by the arrow 171) on the back of the person's calves, and the counter-bearing bar 170, which pivots slightly toward the person's feet during the lifting by the cables 8*a* and 8*b*, applies a force (represented by the arrow 172) on the person's ankles, such that the leg-receiving means 113 allows for a bearing/counter-bearing on the person's legs, which allows the pendular decompression device 1 according to the present invention to perform a flexing movement of the legs, in addition to the traction and oscillation movements, to reproduce a movement close to walking.

Referring to FIG. 12, the leg-receiving means 113 according to a second variant of the second embodiment of the present invention can be seen.

In this second variant of the second embodiment, the two cables 8*a* and 8*b* are no longer attached to the counter-bar 170, but are directly attached to the chutes 129 at their knee-side ends.

Thus, when the cables 8*a* and 8*b* are taut, the chutes 129 apply a force 171 on the back of the person's calves, and the counter-bearing bar 170, which pivots slightly toward the person's feet as the knee-side ends of the chutes 129 are lifted, applies a force 172 on the person's ankles, such that the leg-receiving means 113 allow for a bearing/counter-bearing on the person's legs, which allows the pendular decompression device 1 according to the present invention to perform a flexing movement of the legs, in addition to the traction and oscillation movements, to reproduce a movement close to walking.

Referring to FIGS. 13 and 14, leg-receiving means 213 according to a third variant of the invention can be seen.

The leg-receiving means 213 comprises an H-shaped bracket 280. One of the legs 280*a* of the H-shaped bracket 280 has a cylinder 281 at each end, and the other of the legs 280*b* of the H-shaped bracket 280 has a cylinder 282 at each end.

The cross member 280*c* of the H-shaped bracket 280 is curved such that the cylinders 282 have a height greater than that of the cylinders 281. The cross member 280*c* of the H-shaped bracket 280 is configured to be positioned between the person's legs 40.

The cylinders 281 of the leg 280*a* of the H-shaped bracket 280 rest under the calves, and the cylinders 282 of the leg 280*b* apply on the ankles.

The two cables 8*a* and 8*b* are directly connected to the ends of the leg 280*a* of the H-shaped bracket 280 carrying the cylinders 281 applied under the calves.

Thus, when the cables 8*a*, 8*b* are tensioned during lifting, the cylinders 281 allow a force to be applied (represented by arrow 271) on the back of the person's calves, and the cylinders 282 allow a force to be applied (represented by arrow 272) on the person's ankles, such that the leg-receiving means 213 allow a bearing/counter-bearing to be performed on the person's legs, thereby allowing the pendular decompression device 1 according to the present invention to perform a flexing movement of the legs, in addition to the traction and oscillation movements, to reproduce a movement close to walking.

The invention claimed is:

1. A pendular joint decompression device comprising:

a table configured to support a person lying on his or her back, the table having a head end and a leg end, the table having first and second longitudinal edges extending between the head end and the leg end, and a traction system positioned at the leg end of the table, elevated from the plane of the table, the traction system including cabling, leg-receiving means secured to the cabling and configured to link the cabling to the person's legs, traction means configured to act on the cabling to make traction on the legs, oscillation means configured to act on the cabling to obtain lateral oscillation movements of the legs on either side of the axis of the person's spine, and a control unit adapted to control the traction means and the oscillation means to combine lateral oscillation movements and traction movements on the person's raised legs, the leg-receiving means comprising two interconnected chutes, each chute having an open top, each chute being adapted to receive one of the person's legs and being adapted to close, to block the person's legs, each chute having a first longitudinal edge and a second longitudinal edge extending along the open top of each chute, the first longitudinal edges of the two chutes being adjacent to each other where the chutes are closest to each other, the second longitudinal edges of the two chutes being remote from each other where the chutes are farthest from each other, with the second longitudinal edges of the chutes being respectively adjacent the first and second longitudinal edges of the table, wherein each chute is connected to the cabling at two distinct first and second application points, spaced apart in the longitudinal direction of the chutes such that the first application point is nearer the leg end of the table and the second application point is nearer the head end of the table, the first application point being on the first longitudinal edge of the open top of each chute and the second application point being at the second edge of the open top of each chute, such that when the cabling applies a traction, a force is applied at the two corresponding separate first and second application points on each chute, the cabling being configured to clamp the chutes around the legs, above the foot, at the ankle and calf of the person, the leg-receiving means thus being configured to apply, for each of the person's legs, a force on the back of the calf and a force on the front of the ankle, simultaneously, when the traction means act on the cabling, and wherein the leg-receiving means is configured to receive the person's legs lying on the table, allow a force to be applied on the person's legs at the calves as well as a force to be applied on the person's legs at the ankles when the cabling is tensioned, such that the leg-receiving means allows for a bearing/counter-bearing on the person's legs to make a leg flexing movement, in addition to the lateral oscillation and traction movements on the person's raised legs, to thereby reproduce a walking movement with the bearing/counter-bearing generated by the leg-receiving means enabling the person's legs to flex relative to each other.

2. The pendular joint decompression device according to claim 1, wherein the cabling is configured, when tensioned, to close the chutes for blocking the person's legs.

3. The pendular joint decompression device according to claim 1, wherein the cabling comprises two cables connected to the leg-receiving means, one of the two cables being associated with one of the person's legs and the other of the two cables being associated with the other of the person's legs.

4. The pendular joint decompression device according to claim 1, wherein the cabling comprises two cables to which a bar is connected, one of the two cables being connected at one end of the bar and the other of the two cables being connected at the other end of the bar, the cabling further comprising one among two straps and two cables connected to the leg-receiving means, one of the two straps or cables being connected at one of the ends of the bar and the other of the two straps or cables being connected at the other of the ends of the bar.

5. The pendular joint decompression device according to claim 4, wherein the traction system further comprises two pulleys freely rotatably mounted on a same slide slidably mounted on a crossbar which is arranged transversely to the table, one of the two cables passing over one of the two pulleys and the other of the two cables passing over the other of the two pulleys, the oscillation means being able to transversely move the slide on the crossbar in order to carry out the lateral oscillation movements.

6. The pendular joint decompression device according to claim 5, wherein the spacing between the two pulleys on the slide corresponds to the spacing between the fixing points of the two cables on the bar.

7. The pendular joint decompression device according to claim 3, wherein the traction system further comprises two pulley assemblies freely rotatably mounted on the same slide slidably mounted on a crossbar arranged transversely to the table, one of the two cables passing over one of the two pulley assemblies and the other of the two cables passing over the other of the two pulley assemblies, each pulley assembly comprising two pulleys offset from each other in the longitudinal direction of the table and arranged on either side of the crossbar, the oscillation means being able to transversely move the slide on the crossbar to perform the lateral oscillation movements.

8. The pendular joint decompression device according to claim 7, wherein the spacing between the two pulley assemblies on the slide corresponds to the spacing between the fixing points of the two cables on the bar.

9. The pendular joint decompression device according to claim 5, wherein the oscillation means comprise a cam system interposed between the drive shaft of a motor and the slide to transform the rotational movement of the drive shaft into a movement back and forth of the slide on either side of the longitudinal plane of the table, the motor being controlled in rotation by the control unit.

10. The pendular joint decompression device according to claim 5, wherein the traction system further comprises two uprights carrying at the upper part the crossbar above the table, the traction means also serving as lifting means for raising the person's legs, at a determined angle with respect to the axis of the person's spine, during the lateral oscillation movements and the traction movements.

11. The pendular joint decompression device according to claim 10, wherein the cabling is configured, when tensioned, to close the chutes for blocking the person's legs, and wherein the cabling is configured to automatically close the leg-receiving means upon lifting of the person's legs by the traction means and is configured to automatically open the leg-receiving means upon lowering of the person's legs by the traction means.

12. The pendular joint decompression device according to claim 3, wherein the traction means comprise two winches, the end not connected to the leg-receiving means of one of the two cables being connected to one of the two winches and the end not connected to the leg-receiving means of the other of the two cables being connected to the other of the two winches.

13. The pendular joint decompression device according to claim 3, wherein the traction means comprise a single winch, the ends not connected to the leg-receiving means of the two c cables being connected to an additional bar, the additional bar being connected to the single winch by an additional cable.

14. The pendular joint decompression device according to claim 12, wherein each of the two winches comprises a winch motor, the drive shaft of which carries a drum on which the associated cable is attached and wound up, the winch motor being controlled by the control unit such that the winch motor is configured to drive the drum in a first direction to unwind the associated cable from the drum and in the opposite direction to wind the associated cable around the drum.

15. The pendular joint decompression device according to claim 1, wherein the leg-receiving means are covered with at least one of a foam or gel.

16. The pendular joint decompression device according to claim 1, wherein for each chute a quick release fastener is placed on the cabling so as to allow the opening of the chute.

17. The pendular joint decompression device according to claim 1, wherein the table further comprises at least one of an armpit blocking system for the person, a waist blocking belt for the person, a head blocking cushion for the person, a cervical collar, and a transverse support cushion for the person's knees.

18. The pendular joint decompression device according to claim 3, wherein the traction system further comprises two pulleys freely rotatably mounted on a same slide slidably mounted on a crossbar which is arranged transversely to the table, one of the two cables passing over one of the two pulleys and the other of the two cables passing over the other of the two pulleys, the oscillation means being able to transversely move the slide on the crossbar in order to carry out the lateral oscillation movements.

19. The pendular joint decompression device according to claim 2, wherein the cabling comprises two cables connected to the leg-receiving means, one of the two cables being associated with one of the person's legs and the other of the two cables being associated with the other of the person's legs.

20. The pendular joint decompression device according to claim 2, wherein the cabling comprises two cables to which a bar is connected, one of the two cables being connected at one end of the bar and the other of the two cables being connected at the other end of the bar, the cabling further comprising one among two straps and two cables connected to the leg-receiving means, one of the two straps or cables being connected at one of the ends of the bar and the other of the two straps or cables being connected at the other of the ends of the bar.

* * * * *